Dec. 6, 1955  A. RINGER  2,726,187
METHOD OF PRODUCING STEREOSCOPIC SLIDES
Filed Nov. 16, 1953  2 Sheets-Sheet 1

INVENTOR.
ARTHUR RINGER
BY
Marvin B Davis
ATTORNEY

Dec. 6, 1955  A. RINGER  2,726,187
METHOD OF PRODUCING STEREOSCOPIC SLIDES
Filed Nov. 16, 1953  2 Sheets-Sheet 2

INVENTOR.
ARTHUR RINGER
BY
*Marvin B. Davis*
ATTORNEY

United States Patent Office 2,726,187
Patented Dec. 6, 1955

2,726,187

METHOD OF PRODUCING STEREOSCOPIC SLIDES

Arthur Ringer, Laverne, Okla.

Application November 16, 1953, Serial No. 392,209

8 Claims. (Cl. 154—118)

This invention relates to the method of producing stereoscopic slide strips with each strip having companionate film pictures.

Heretofore stereoscopic slide strips have been used with companionate film pictures; but this invention relates to an inexpensive method to produce film slide strips in quantitives with accuracy to assure the proper alignment of the films in an optical instrument for viewing the pictures, or the film slide strips may be used to print pictures to be observed in an optical instrument. This improved method may be used by amateurs as well as professionals with equal success and it is free from touching the pictures with the fingers.

An object of the present improved method is to accurately cut a roll or strip of film into pictures, quickly and accurately transpose the pictures over strips of flat material having equally spaced windows therein, accurately cutting and placing each picture over a respective window, placing the companionate film pictures next to each other in the same strip of flat material, the strips of flat material being moved lengthwise together in one direction in a given plane, the film strip being moved in the opposite direction for cutting the film pictures so that the right film picture is mounted to the left of the right strip companionate film picture and the left film picture is mounted to the right of the left strip companionate film picture, moving or detouring one of the strips of flat material through space and return it to the same plane of the other strips as they are being advanced to align the windows of the strip detoured through space with the windows of the other strips, the windows of the one strip being spaced back one space from the windows of the other strips and shearing the companionate film picture strips off in lengths for stereoscopic slides.

Another object of the present improved method is to produce stereoscopic slide strips with each strip having a pair of film pictures spaced apart comprising the following steps; moving a strip of flat material in one direction having a plurality of spaced window openings therein and an adhesive coating thereon, moving a film strip of pictures over the strip of flat material in the opposite direction, cutting the film pictures off one by one and pressing each one of them as cut over a respective window opening to adhere to the adhesive coating on the strip, the strip being advanced under the film at intervals to register each window opening with a cut film picture, moving a second strip of flat material having a plurality of spaced window openings therein to register with the window openings of the first strip in the same direction as the first mentioned strip of flat material, pressing the second strip of flat material against the cut film pictures and the adhesive coated first strip of flat material, and cutting the adhered strips off in lengths to contain a pair of film pictures in each length.

Another object of the present improved method is to produce stereoscopic rotating disk type flat members with each having a plurality of pairs of film pictures spaced apart comprising the following steps; moving into position flat material having a plurality of spaced window openings therein and an adhesive coating thereon, moving a film strip of pictures over the flat material, cutting the film pictures off one by one and pressing each one of them as cut over a respective window opening to adhere to the adhesive coating on the flat material, the flat material being moved under the film at intervals to register each window opening with a cut film picture, moving a second flat material having a plurality of spaced window openings therein to register with the window openings of the first mentioned flat material, and pressing the second mentioned flat material against the cut film pictures and the adhesive coated first strip of flat material.

With these objects and any workable portions thereof in view the invention will be more fully understood from the examples illustrated in the accompanying drawing, described in the following specification and having the scope of the appended claims.

Figure 1:
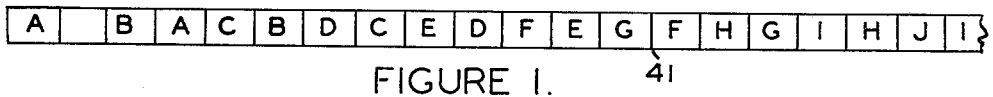
Figure 1 is a fragmentary view of a film strip illustrating the sequence of the pictures as taken and pointed out by companionate film letters.

The improved method of producing stereoscopic slides is best understood by the preferred mechanism illustrated in the drawings which will first be described together with explanations for some alterations that may be made.

The long flat plate 15 is provided with a suitable support 16 and is sufficiently wide enough to receive the width of 3 long strips 17, 18 and 19 of flat mounting material which is conveniently prepared in rolls 20, 21 and 22 and preferably supported at 23 above the plate 15. All of these strips of flat mounting material have equally spaced window openings 24, 25 and 26 respectively in them throughout the lengths thereof, a plurality of equally spaced apertures 27, 28 and 29 respectively therein throughout the lengths thereof, and the strips 17, 18 and 19 have the top surfaces coated with either a hard gum, glue or an ever ready adhesive 30, 31 and 32. The hard gum when used requires a heating element 33 such as illustrated in Figure 4, the glue requires a well known wetting contact before using but the ever ready adhesive such as used with cellophane is always ready for use.

Figure 4:
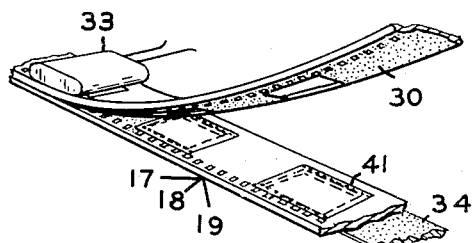
Figure 4 is a fragmentary view in perspective illustrating a different method of adhesive contact with the pictures, the adhesive transparent strip being placed under the lower mounting strip, the upper companionate mounting strip having a gum coating thereon and passing under a heating element to melt the gum to adhere to the lower mounting strip and film pictures.

However the coatings on the strips 17, 18 and 19 may be dispensed with by having transparent strips of ever ready adhesive 34 applied to the lower surfaces of strips 17, 18 and 19 and extended throughout the lengths thereof as shown in Figure 4.

The roller 35 supported by members 36 guides strips 17, 18 and 19 close to the top surface of the plate 15 and the strips 17, 18 and 19 are moved under a carriage 37.

The carriage 37 is mounted above the plate 15 and manually reciprocated on a guide member 38 in a transverse direction to the long strips 17, 18 and 19, and carries a film support member 39 to receive the spool 40 for the developed film 41. The film 41 is manually moved over the carriage 37 by means of the film feed member 42 with the prongs 43 sloping forwardly and downwardly to the direction of movement of the film. The film with the usual perforations 44 is moved in the reverse direction to the movement of strips 17, 18 and 19 with the prongs 43 entered in the perforations 44. The prongs 43 automatically withdraw from the film perforations when the feed member is moved backward over the film to a grip for a further movement.

The film 41 is advanced through the shears 45 until a film picture is fully extended beyond it and the shears are closed to shear the picture from the rest of the film. A spring member 46 is attached to the upper portion of the shears and presses the film picture against the selected strip for the attachment thereto by one of the adhesives above mentioned. The guide member 38 is provided with alignment stops 68 to register the carriage, shears and film over a selected lower mounting strip window.

Three upper long strips 47, 48 and 49 of flat mounting material are identical in shape, size, window openings and apertures to the lower strips 17, 18 and 19, are preferably fed from rolls 50, 51 and 52 respectively, under roller 53 to make contact with the companion lower flat mounting strips and moved under the pressure roller 54 for sealing the upper long strips to the lower long strips.

The center companion strips with the film pictures therebetween are detoured over a roller 55 provided with adjustments 56 to move the film pictures backward one space by the time they are passed under the traction roller 57 so that all three stereoscopic slide strips 58, 59 and 60 will be aligned with pairs of companionate pictures and sheared off at one time with the manually operated shears 61.

A handle 62 on the crank 63 turns the shaft 64, traction roller 57, and gear teeth 65, 66 and 67. The gear teeth 65, 66 and 67 enter the apertures 27, 28 and 29 respectively and move all of the strips uniformly along the top of the flat plate 15 through the shears 61 for cutting the strips into lengths, each length with pairs of like films to be used as stereoscopic flat slides.

Now for the operation a usual developed film strip is illustrated in Figure 1 to show how the companionate pairs of like film pictures designated by like letters are arranged. Beginning from the left end, the first picture is A, the second is a blank, the third is B, the fourth A, the fifth C, the sixth B, the seventh C, the eighth C, the ninth E, the tenth D, the eleventh F, the twelfth E, the thirteenth G, and following in like manner we have F, H, G, I, H, J, I, etc.

Figure 2:
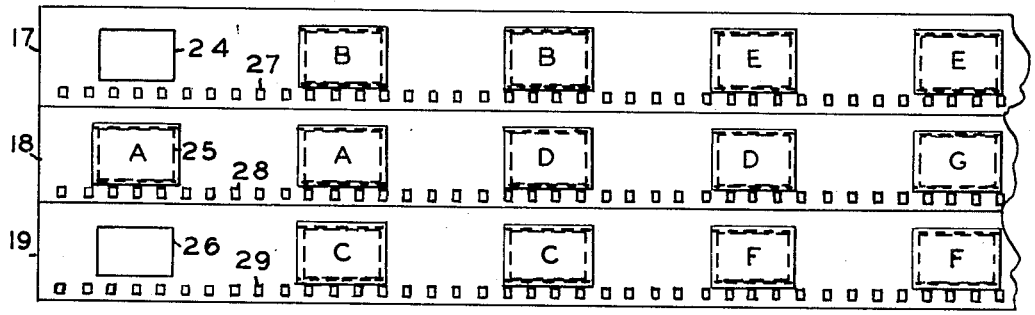
Figure 2 is an enlarged fragmentary view of the lower three mounting strips of flat material, illustrating the sequence of the film pictures as cut from the film and placed on the lower mounting strips.
Figure 3:
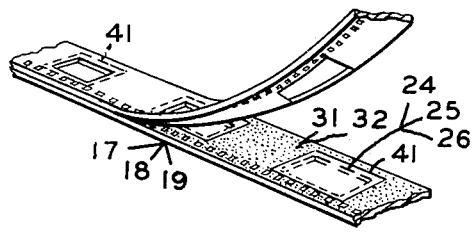
Figure 3 is a fragmentary view in perspective illustrating a lower mounting strip having the upper side thereof coated with an adhesive, the film pictures placed thereon, and a companionate duplicate upper strip moving downward for sealing the film pictures and upper strip against the lower mounting strip.
Figure 5:
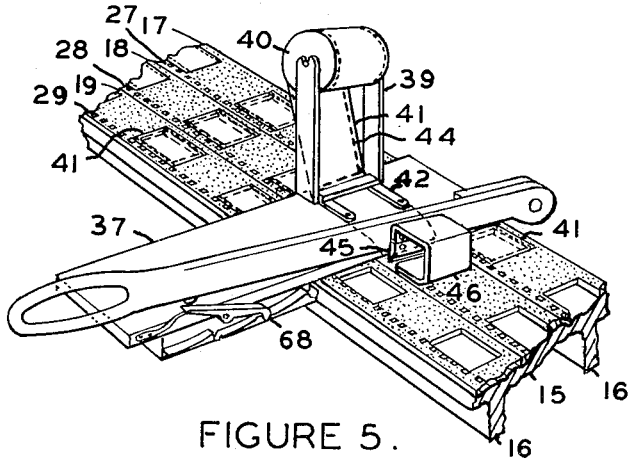
Figure 5 is an enlarged perspective view of the film and cutter carriage as reciprocated over the lower mounting strips of flat material.
Figure 6:
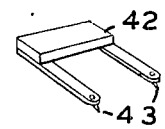
Figure 6 is a perspective of the film feed member for manually advancing the film over the cutter knife.
Figure 7:
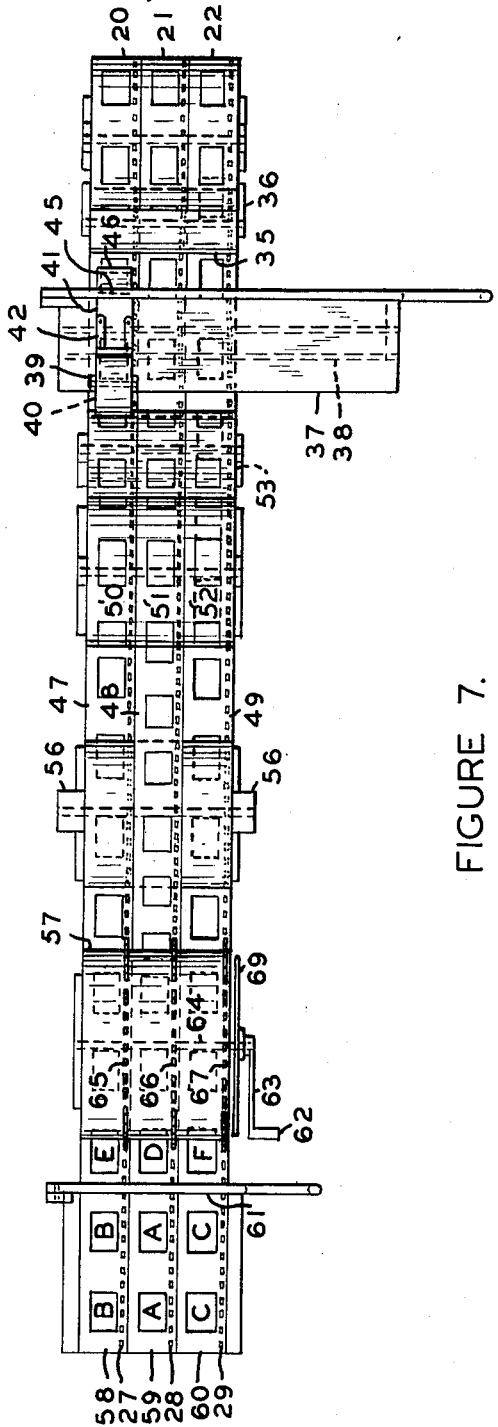
Figure 7 is a plan view illustrating one form of mechanism required to perform the necessary steps to produce the stereoscopic slide strips.
Figure 8:
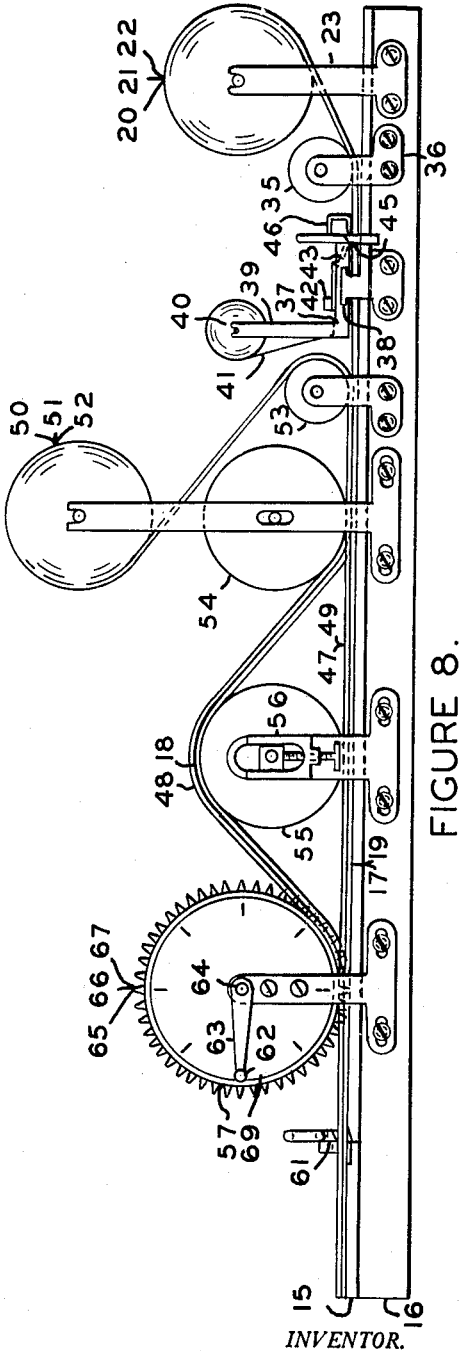
Figure 8 is a longitudinal elevation of Figure 7.

The mounting strips 17, 18 and 19 pass under the carriage 37 as illustrated in Figure 5 in the order of picture orientation as illustrated in Figure 2. The roll of film 41 is mounted in the film support member 39 and the film is moved lengthwise in the opposite direction of the mounting strips by the film feed member 42. The picture A is moved through the shears 45, the carriage 37 moved to register the picture A with the window A in the center mounting strip 18. The right film picture A is cut and pressed down on the mounting strip by the shears 45 and spring member 46 to make the picture adhere thereto by the adhesive. The carriage 37 is moved to register the blank on the lower mounting strip 19 and deposited.

The lower mounting strips are then moved to register the next three window openings with the shears by turning the handle and crank to the next graduating mark on the dial 69, the teeth 65, 66 and 67 enter the apertures 27, 28 and 29 and pull the lower mounting strips along the plate 15.

Picture B is deposited on the strip 17, the next picture A is deposited on the strip 18, and the next picture C is deposited on the strip 19, the handle and crank are turned another graduation on the dial 69 and the operations are continued until the film pictures are exhausted.

The upper mounting strips 47, 48 and 49 are pulled from their respective rollers and passed under the pressure roller 54 to seal them to the pictures and lower mounting strips.

The center strips are detoured over an object or roller 55 to offset the window spacing therein one space behind the windows of the other strips by the time it is returned to the plate 15 and all three strips are aligned with companionate film pictures for shearing in slide lengths 58, 59 and 60. The turning of the crank moves the slides to the proper shearing length.

What I claim as new and desire to secure by Letters Patent is:

1. The method of producing a plurality of stereoscopic slide strips with each strip having a pair of film pictures spaced apart comprising the following steps; moving a plurality of long strips of flat material in one direction having a plurality of spaced window openings therein and an adhesive coating thereon, intermittently moving a film strip of pictures over the plurality of long strips of flat material in the opposite direction, cutting the film pictures off one by one between movements and placing each one of them as cut over a respective window opening, moving the plurality of long strips of flat material at intervals with the cut pictures upon them under the other uncut pictures so as to place the right hand pictures of a companionate pair on the left hand side of the stereoscopic slide, intermittently moving companion long strips over the plurality of long strips of flat material, sealing the pictures between the plurality of long strips of flat material and the companion long strips, raising the even numbered plurality of long strips of flat material with its companion strip and returning it to the level of the other plurality of long strips of flat material with the pictures aligned transversely in pairs, and cut each of the plurality of long strips of flat material with its companion long strip at one cutting stroke into a stereoscopic slide strip.

2. The method of producing stereoscopic slide strips with each strip having a pair of film pictures spaced apart comprising; placing a plurality of long strips of flat material side by side on the same level with each having a plurality of equally spaced windows cut therein and a plurality of equally spaced apertures cut therein for mechanical movement, intermittently moving all of the long strips of flat material lengthwise in one direction, intermittently moving a film strip of pictures in a parallel plane slightly above the strips of mounting material in the opposite direction, reciprocating the film strip with intermittent stops transversely over the long strips of flat material, cutting and depositing a film picture on each window of the long strips of flat material at each intermittent stop, moving companion long strips over the long strips of flat material, sealing the pictures in position with the companion long strips over their respective windows, raising the even numbered long strips of flat material with the companion long strips and pictures and returning them to the level of the other long strips of flat material so as to realign the windows of the even numbered strips one space behind the windows of the other strips of flat material, and cutting all long strips of material into lengths having companion film pictures.

3. A method of placing pictures in pairs on mounting strips from a film having a plurality of interlaced pairs of pictures with each pair of pictures being different from the other pairs on the film comprising the following steps, placing a plurality of long mounting strips side by side on the same plane with the number of strips being equal to one plus the number of film pictures being interlaced between one pair of film pictures, all of the long mounting strips intermittently moved together in one direction, intermittently moving strips of film pictures in the opposite direction in a parallel plane and slightly above the long mounting strips, consecutively moving the film strip with intermittent stops transversely over the number of long mounting strips and depositing by cutting a film picture on each long mounting strip so as to space each pair of pictures with one following the other on the same long mounting strip, moving the long mounting strips at intervals with the cut pictures upon them under the other uncut pictures so as to place the right hand picture of a companionate pair on the left hand side of the stereoscopic slide, raising the even numbered long mounting strips with its companion strip and returning it to the level of the other long mounting strips with the pictures aligned transversely in pairs, and cut each of the long mounting strips at one cutting stroke into a stereoscopic slide strip.

4. A method of placing pictures in pairs on mounting strips from a film having a plurality of interlaced pairs of pictures with each pair of pictures being different from the other pairs on the film comprising the following steps, placing a plurality of long mounting strips side by side on the same plane with the number of strips being equal to one plus the number of film pictures being interlaced between one pair of film pictures, all of the long mounting strips intermittently moved together in one direction, moving strips of film pictures in the opposite direction in a parallel plane and slightly above the long mounting strips, consecutively moving the film strip transversely over the number of long mounting strips and depositing by cutting a film picture on each long mounting strip so as to space each pair of pictures with one following the other on the same long mounting strip, moving the long mounting strips at intervals with the cut pictures upon them under the other uncut pictures so as to place the right hand picture of a companionate pair on the left hand side of the stereoscopic slide, moving companion long strips over the plurality of long mounting strips, sealing the pictures between the long mounting strips and the companion strips, raising the even numbered long mounting strips with its companion strip and returning it to the level of the other long mounting strips with the pictures aligned transversely in pairs, and cut each of the long mounting strips at one cutting stroke into a stereoscopic slide strip.

5. A method of placing pictures in pairs on mounting strips from a film having a plurality of interlaced pairs of pictures with each pair of pictures being different from the other pairs on the film comprising the following steps, placing a plurality of long mounting strips side by side on the same plane with the number of strips being equal to one plus the number of film pictures being interlaced between one pair of film pictures, all of the long mounting strips intermittently moved together in one direction, moving strips of film pictures in the opposite direction in a parallel plane and slightly above the long mounting strips, consecutively moving the film strip transversely over the number of long mounting strips and depositing by cutting a film picture on each long mounting strip so as to space each pair of pictures with one following the other on the same long mounting strip, moving companion long strips over the plurality of long mounting strips, sealing the pictures between the long mounting strips and the companion strips, raising the even numbered long mounting strips with its companion strip and returning it to the level of the other long mounting strips with the pictures aligned transversely in pairs, and cut each of the long mounting strips at one cutting stroke into a stereoscopic slide strip.

6. A method of placing film pictures in pairs on mounting strips from a film having a plurality of interlaced pairs of pictures with each pair of pictures being different from the other pairs on the film comprising the following steps, placing a plurality of long mounting strips side by side on the same plane with the number of long mounting strips being equal to one plus the number of film pictures interlaced between one pair of film pictures, intermittently move all of the long mounting strips in one direction, intermittently move the film strip of pictures in the opposite direction in a parallel plane slightly above the long mounting strips, consecutively move the film strip transversely over the number of long mounting strips between movements of the long mounting strips, and deposit by cutting a film picture on each long mounting strip so as to space each pair of pictures with one following the other on the same long mounting strip.

7. A method of placing film pictures in pairs on mounting strips as claimed in claim 6 with the following added steps, raise a portion at a time of one long mounting strip to pass it through a longer space of travel and return it to the level of the other long mounting strips with the pictures re-aligned transversely in pairs, and cut one slide strip with a pair of pictures mounted thereon from each of the long mounting strips at one cutting stroke between movements of the long mounting strips.

8. A method of placing film pictures in pairs on mounting strips as claimed in claim 6 with the following added steps, moving companion long strips over the plurality of long mounting strips after the pictures have been deposited thereon, sealing the pictures between the long mounting strips and companion strips, raise a portion at a time of one long mounting strip with its companion long strip and return it to the level of the other long mounting strips with the pictures aligned transversely in pairs, and cut one slide strip with a pair of pictures from each of the long mounting strips with their companion strips at one cutting stroke between movements of the long mounting strips.

References Cited in the file of this patent

UNITED STATES PATENTS

| | | |
|---|---|---|
| 1,983,323 | Stokes | Dec. 4, 1934 |
| 2,302,561 | Libby et al. | Nov. 17, 1942 |
| 2,656,631 | Cadwell et al. | Oct. 27, 1953 |